United States Patent Office 3,646,028
Patented Feb. 29, 1972

3,646,028
CERTAIN 2-AMINO-4-PHENYL-3,4-
DIHYDROQUINAZOLINES
Gordon Northrup Walker, Morristown, N.J., assignor to
Ciba Corporation, Summit, N.J.
No Drawing. Continuation-in-part of application Ser. No.
731,316, May 22, 1968, which is a continuation-in-part
of application Ser. No. 638,657, May 15, 1967, which
in turn is a continuation-in-part of application Ser. No.
579,483, Sept. 15, 1966, now Pat. No. 3,560,501. This
application Sept. 22, 1969, Ser. No. 860,090
Int. Cl. C07d 51/48
U.S. Cl. 260—256.5 R         6 Claims

ABSTRACT OF THE DISCLOSURE 2-amino-4-aryl-3,4-dihydro-quinazolines of the formula

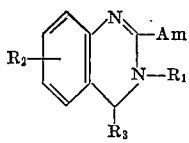

Am=an amino or hydrazino group
$R_1$=H, aliphatic or araliphatic radical
$R_2$=H, alkyl, alkoxy, (alkylmercapto, halogeno, $CF_3$ or $NO_2$
$R_3$=aromatic radical acyl derivatives, quaternaries and salts thereof, such as the 2-dimethylamino-4-phenyl-6-chloro-3,4-dihydro-quinazoline hydrochloride, exhibit anti-inflammatory and coronary dilatory effects.

CROSS-REFERENCES TO RELATED APPLICATIONS

This is a continuation-in-part of application Ser. No. 731,316, filed May 22, 1968 (now abandoned), which in turn is a continuation-in-part of application Ser. No. 638,657, filed May 15, 1967 (now abandoned), which in turn is a continuation-in-part of application Ser. No. 579,483, filed Sept. 15, 1966, now Pat. No. 3,560,501.

SUMMARY OF THE INVENTION

The present invention concerns and has for its object the provision of new 2-amino-4-aryl-3,4-dihydro-quinazolines, more particularly those of the Formula I

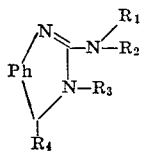

in which Ph stands for a 1,2-phenylene radical, each of $R_1$, $R_2$ and $R_3$ for hydrogen, an aliphatic radical or araliphatic radical, $R_1$ also for an amino group, and $R_4$ for a carbocyclic or heterocyclic aromatic radical, acyl derivatives, quaternaries and salts thereof, corresponding pharmaceutical compositions, as well as methods for the preparation of these products. Said compositions are useful, preferably for oral application, either as anti-inflammatory agents in the treatment of tissue inflammations, such as arthritic inflammations, or as coronary vasodilators in the treatment of myocardial ischemia, such as angina pectoris.

DESCRIPTION OF THE PREFERRED EMBODIMENTS

The 1,2-phenylene radical Ph is unsubstituted or substituted by one or more than one, preferably one or two, of the same or different substituents attached to any of the positions available for substitution. Such substituents are, for example, lower alkyl, such as methyl, ethyl, n- or i-propyl or -butyl, etherified hydroxy or mercapto, for example lower alkoxy or alkylmercapto, such as methoxy, ethoxy, n- or i-propoxy or -butoxy, methyl- or ethylmercapto, esterified hydroxy, for example halogeno, such as fluoro, chloro or bromo, trifluoromethyl or nitro. Preferred 1,2-phenylene radicals Ph are 1,2-phenylene, (lower alkyl) - 1,2 - phenylene, (lower alkoxy) - 1,2 - phenylene, (lower alkylmercapto) - 1,2 - phenylene, (halogeno)-1,2-phenylene, (trifluoromethyl)-1,2-phenylene or (nitro)-1,2-phenylene. The term "lower," referred to above and hereinafter in connection with organic radicals or compounds respectively, defines such with up to 7, preferably up to 4 carbon atoms.

An aliphatic radical $R_1$, $R_2$ and/or $R_3$ represents especially lower alkyl, such as methyl, ethyl, n- or i-propyl, -butyl, -pentyl, -hexyl or -heptyl. It may also stand for lower alkenyl, such as allyl or methallyl, cycloalkyl or cycloalkyl-lower alkyl having from 3 to 8, especially from 5 to 7 ring-carbon atoms, such as cyclopropyl, cyclopentyl, cyclohexyl, cycloheptyl or cyclooctyl, cyclopropylmethyl, 2-cyclopentylethyl, cyclohexylmethyl, 1-cyclohexylethyl or cycloheptylmethyl. An araliphatic radical is preferably monocyclic carbocyclic aryl-lower alkyl, such as benzyl, 1- or 2-phenylethyl. These radicals are unsubstituted or contain additional substituents, especially in the aromatic portion those mentioned for Ph and in the aliphatic portion preferably hydroxy. They also may be interrupted by hetero atoms, preferably by one oxygen, sulfur and/or nitrogen atom. Such radicals are, for example, lower alkoxy-lower alkyl, such as methoxymethyl, ethoxymethyl, n-propoxymethyl, 1- or 2-methoxy-, ethoxy or i-propoxyethyl, 1-, 2- or 3-methoxy-, ethoxy- or n-propoxypropyl or 4-tert. butoxybutyl, the corresponding lower alkylmercapto-lower alkyl or phenoxy-lower alkyl groups, mono- or di-lower alkylamino-lower alkyl, lower alkyleneimino-lower alkyl or aza-, oxa- or thia-alkyleneimino-lower alkyl or N-lower alkyl-, hydroxy-lower alkyl- or phenyl-aza-alkyleneimino-lower alkyl groups with preferably 4 to 6 ring-carbon atoms and in which the hetero-atoms are separated from each other by at least 2 carbon atoms, such as 2-methylamino-, 2-dimethylamino- or 2-diethylamino-ethyl, 3-dimethylamino- or 3-diethylamino-propyl, 2-pyrrolidino-ethyl, 3 - piperidino - propyl, 2-piperazinoethyl, 2 - (4 - methyl-piperazino)-ethyl, 3-(4-ethyl-piperazino)-propyl, 2 - [4 - (2-hydroxyethyl)-piperazino]-ethyl, 2-(4 - phenyl - piperazino) - ethyl, 2-morpholino-ethyl or 3-thiamorpholino-propyl.

$R_1$ and $R_2$, when taken together, also represent lower alkylene, aza-, oxa- or thia-alkylene or N-lower alkyl-, hydroxy-lower alkyl- or phenyl-aza-alkylene in which the heteroatoms are separated from each other by at least 2 carbon atoms, such as 1,2-ethylene, 1,4-butylene, 1,4- or 1,5-pentylene, 3 - methyl - 1,5 - pentylene, 3-methyl-1,5-pentylene, 2,5- or 1,6 - hexylene or 2,6 - heptylene; 3-aza-1,5-pentylene, 3-methyl, ethyl, 2-hydroxyethyl- or phenyl-3-aza-1,5-pentylene, 3-oxa or thia-1,5 pentylene.

An aromatic radical $R_4$, or that present in the above araliphatic radicals, particularly stands for mono- or bicyclic carbocyclic aryl, i.e. phenyl, 1- or 2-naphthyl, or monocyclicheterocyclic aryl, such as furyl, thienyl or pyridyl. Said aryl groups are unsubstituted or contain one or more than one of the same or different substituents attached to any position available for substitution, for example those mentioned for Ph. They primarily stand for phenyl, (lower alkyl)-phenyl, (lower alkoxy)-phenyl, (lower alkylmercapto)-phenyl, (halogeno)-phenyl, (trifluoromethyl)-phenyl, (nitro)-phenyl, pyridyl, (lower alkyl)-pyridyl, thienyl or (lower alkyl)-thienyl.

The acyl derivatives of the invention are particularly those of carboxylic acids, preferably aliphatic, araliphatic or aromatic carboxylic acids, such as those mentioned below, especially of lower alkanoic acids, such as acetic, propionic, butyric or pivalic acid. The quaternaries are preferably lower alkyl or aralkyl quaternaries.

The compounds of this invention exhibit valuable pharmacological properties. Apart from analgesic, central nervous depressing and diuretic effects, they exhibit primarily antiinflammatory and coronary dilatory activity, as can be demonstrated in animal tests using, for example mammals, such a mice, rats or dogs, as test objects. The compounds of the invention may be applied in the form of aqueous solutions or suspensions, for example, by stomach tube to rats in the dosage range between about 1 and 50 mg./kg./day, preferably between about 5 and 25 mg./kg./day, or in about the latter dosage range into a loop of the small intestine of anesthetized dogs. The antiinflammatory effects are advantageously demonstrated in the rat paw edema test and the coronary vasodilation in anesthetized dogs, whose coronary blood flow is recorded by means of an electromagnetic flow meter. Besides their above-mentioned use, the compounds of the invention are also useful as intermediates for the preparation of other valuable products, particularly of pharmacologically active compounds. Thus, the corresponding 2-amino-4-arylquinazolines are obtained from the compounds of this invention by dehydrogenation.

Particularly useful antiinflammatory compounds are those of Formula I in which Ph is 1,2-phenylene, (lower alkyl) - 1,2-phenylene, (lower alkoxy) - 1,2-phenylene or (halogeno)-1,2-phenylene each of $R_1$ and $R_3$ is hydrogen or lower alkyl, $R_2$ is hydrogen, amino, di-lower alkyl-amino, lower alkyl, lower alkenyl, cycloalkyl with 3 to 8 carbon atoms, hydroxy-lower alkyl, amino-lower alkyl, mono- or di-lower alkylamino-lower alkyl, lower alkyleneimino-lower alkyl, lower aza, oxa- or thiaalkylene-imino-lower alkyl, N-lower alkyl- or hydroxy-lower alkyl-lower aza-alkyleneimino-lower alkyl, $R_1$ and $R_2$, when taken together also are lower alkylene or lower aza-, oxa- or thiaalkylene, in which radicals the heteroatoms are separated from each other by at least 2 carbon atoms, and $R_4$ is phenyl, (lower alkyl)-phenyl, (lower alkoxy)-phenyl or (halogeno)-phenyl, and therapeutically acceptable acid addition salts thereof. Particular useful coronary dilatory compounds are those of Formula I, in which Ph is 1,2 - phenylene, (lower alkyl) - 1,2 - phenylene, (lower alkoxy)-1,2-phenylene or (halogeno)-1,2-phenylene, $R_1$ is hydrogen or lower alkyl, each of $R_2$ and $R_3$ is lower alkyl, lower alkenyl or hydroxy-lower alkyl wherein the heteroatoms are separated from each other by at least 2 carbon atoms, and $R_4$ is phenyl, (lower alkyl)-phenyl, (lower alkoxy)-phenyl, (halogeno)-phenyl or (trifluoromethyl)-phenyl, and therapeutically acceptable acid addition salts thereof.

Especially mentioned are the compounds of Formula II

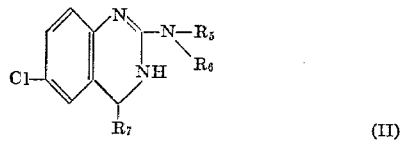

(II)

in which $R_5$ is hydrogen, methyl or ethyl and $R_6$ is hydrogen, amino, dimethylamino, methyl, ethyl, n-propyl, i-butyl, allyl, cyclopropyl, 2-hydroxyethyl, 2-dimethyl-amino-ethyl, 3-(4-methylpiperazino)-propyl, benzyl or 2-pyridylmethyl or $R_5$ and $R_6$ together are 1,4-butylene, 1,5-pentylene, 1,6-hexylene, 3-methyl-3-aza-1,4-pentylene or 3-oxa-1,5-pentylene and $R_7$ is phenyl and therapeutically acceptable acid addition salts thereof, which, when given orally to rats at doses between about 1 and 50 mg./kg./day, preferably between about 5 and 25 mg./kg./day, show outstanding antiinflammatory effects according to the granulama pouch or carrageenin paw test.

Especially mentioned are also the compounds of Formula II in which each of $R_5$ and $R_6$ is methyl, ethyl or 2-hydroxyethyl and $R_7$ is phenyl, preferably (fluoro- or chloro)-phenyl and therapeutically acceptable acid addition salts thereof, which, when applied into a loop of the small intestine of anesthetized dogs at doses between about 5 and 25 mg./kg./day, preferably between about 5 and 15 mg./kg./day, show outstanding coronary dilatory effects.

The compounds of this invention are prepared according to known methods. For example, the process for their preparation consists in (a) reacting a 2-hydroxy or mercapto-4-aryl-3,4-dihydroquinazoline, more particularly such of the Formula III

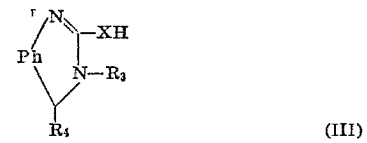

(III)

in which X stands for oxygen or sulfur, or preferably a reactive ester or ether thereof, with ammonia or an amine, preferably that of the formula $R_1$—NH—$R_2$, or (b) condensing an N-(α-aryl-2-aminobenzyl)-urea, thiourea or guanidine, more particularly such of the Formula IV.

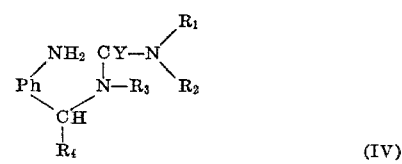

(IV)

in which Y stands for oxygen, sulfur or imino, or ethers of the urea or thiourea, or (c) condensing an N-(α-aryl-2-aminobenzyl)-cyanamide, more particularly such of the Formula V

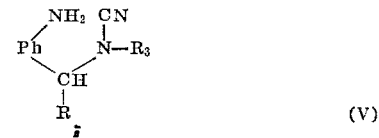

(V)

and, if desired, converting any compound obtained into another disclosed compound.

A reactive ester of the 2-hydroxy-4-aryl-3,4-dihydroquinazoline, more particularly is such of a hydrohalic or sulfonic acid, such as of hydrochloric, hydrobromic, methane-, ethane-, benzene- or p-toluenesulfonic acid. An ether of the compounds mentioned under items (a) and (b) is preferably a lower alkyl ether of the 2-hydroxy or mercapto-4-aryl-3,4-dihydro-quinazoline or of the corresponding N-(α - aryl-2-aminobenzyl)-isourea or isothiourea. In the condensation according to (b) any water, alcohol or mercaptan formed may either be distilled off aceotropically or absorbed by a condensing agent, such as a carbodiimid.

The compounds obtained according to said process may be converted into other disclosed compounds by methods in themselves known. Thus, for example, into any primary, or secondary or tertiary amino nitrogen atom present, for example into compounds of Formula I in which $R_1$, $R_2$ and/or $R_3$ stands for hydrogen, a substituent may be introduced, if necessary, after conversion of the compound obtained into a metal, e.g. alkali metal, derivative thereof. This can be done, for example, by reaction with a reactive ester of an appropriate alcohol, for example, that of a hydrohalic, e.g. hydrochloric, hydrobromic or hydroiodic acid, or a sulfonic acid, such as a lower alkane or benzene sulfonic acid, e.g. those mentioned above, or an aryl diazonium salt, or by reductive alkylation, i.e. reaction with an appropriate oxo- compound and subsequent or simultaneous reduction, whereby higher substituted amines or hydrazines, or quaternaries are obtained. Analogously, primary or secondary amines or hydrazines may be acylated, for example with reactive functional derivatives of the corresponding acids, e.g. the halides or anhydrides thereof. In resulting compounds amino substituted by radicals which can be eliminated, for example, amino-substituted by α-arylalkyl, e.g. benzyl, or acyl, e.g. acetyl, or phthaloyl radicals, the said radicals can be split off in the usual manner by hydrogenolysis, hydrolysis or hydrazinolysis.

The above-mentioned reactions are carried out according to standard methods, in the presence or absence of diluents, preferably such as are inert to the reagents and are solvents thereof, of catalysts, condensing agents and/or inert atmospheres, at low temperatures, room temperature or elevated temperatures, at atmospheric or superatmospheric pressure. Condensing agents are especially used in the reaction with said reactive esters in order to eliminate the acid formed. They are basic agents, for example, alkali or alkaline earth metal carbonates or lower alkoxides, or more especially, organic bases such as pyridine or collidine, but particularly aliphatic tertiary amines, such as a tri-lower alkylamine, e.g. triethylamine.

The compounds of the invention are obtained in the free form or in the form of their salts, depending on the conditions under which the process is carried out. Salts that are obtained can be converted into the free bases in known manner, for example, with alkalis or ion exchangers. Free bases that are obtained can be converted into salts by reaction with inorganic or organic acids, especially those that are suitable for the formation of therapeutically useful salts. Such acids are, for example, hydrohalic acids, e.g. hydrochloric, hydrobromic, sulfuric, phosphoric, nitric or perchloric acid, aliphatic, alicyclic, araliphatic, aromatic or heterocyclic carboxylic or sulfonic acids, for example, formic, acetic, propionic, succinic, glycollic, lactic, malic, tartaric, citric, ascorbic, maleic, hydroxymaleic, pyroracemic, phenylacetic, benzoic, 4-aminobenzoic, anthranilic, 4-hydroxybenzoic, salicylic, aminosalicylic, embonic, nicotinic, methanesulfonic, ethanesulfonic, hydroxyethanesulfonic, ethylenesulfonic, halogenbenzenesulfonic, toluenesulfonic, naphthalenesulfonic and sulfanilic acid; methionine, trytophan, lysine and arginine.

These or other salts, for example, the picrates, can also be used for purification of the bases obtained: the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The invention further includes any variant of the present process, in which an intermediate obtainable at any stage of the process is used as starting material and any remaining steps are carried out, or the process is discontinued at any stage thereof, or in which the starting materials are formed under the reaction conditions, or in which the reaction components are used in the form of their salts. Mainly, those starting materials should be used in the reaction of the invention that lead to the formation of those compounds indicated above as being specially valuable.

The starting material used in reaction (a) is prepared from the corresponding 2-hydroxy- or mercapto-4-arylquinazolines, or the esters or ethers thereof, inter alia disclosed in U.S. Pat. No. 3,305,553, by partial reduction with the use of alkali metal or alkaline earth metal borohydrides, such as sodium borohydride. This process is new and is considered to be included within the scope of the present invention. The starting material used in reaction (b) can be obtained from corresponding α-aryl-2-aminobenzylamines by reaction with isocyanates isothiocyanates, carbamic acid halides, O-alkyl-isoureas or S-alkyl-isothioureas, or by solvolysis of corresponding cyanamides. The latter, i.e. the starting material used in reaction (c), can be obtained by reacting said α-aryl-2-aminobenzylamines with cyanogen halides. These starting materials may be formed as intermediates under the reaction conditions for the formation of the final products.

The compounds of the invention can be used, for example, for the manufacture of pharmaceutical compositions containing them in conjunction or admixture with inorganic or organic, solid or liquid pharmaceutical excipients, suitable for enternal, parenteral or topical administration. Suitable excipients are substances that do not react with the compounds of the invention, for example, water, gelatine, sugars, e.g. lactose, glucose or sucrose, starches, e.g. corn starch or arrowroot, stearic acid or salts thereof, e.g. magnesium or calcium stearate, talc, vegetable fats or oils, gums, alginic acid, benzyl alcohols, glycols and other known excipients. The compositions may be, for example, in solid form as tablets, dragees or capsules, or in liquid form as solutions, suspensions or emulsions. They may be sterilized and/or contain adjuvants, such as preserving, stabilizing, wetting or emulsifying agents, solution promoters, salts for regulating the osmotic pressure and/or buffers. They may further contain other therapeutically valuable substances. Said pharmaceutical compositions are prepared by conventional methods and contain about 0.1 to 75%, more particularly 1 to 50%, of the active ingredient. They are also included within the scope of the present invention.

The following examples are intended to illustrate the invention and are not to be construed as being limitations thereon. Temperatures are given in degrees centigrade, and all parts wherever given are parts by weight.

EXAMPLE 1

2.5 g. 2,6-dichloro-4-phenyl-3,4-dihydro-quinazoline are dissolved in 140 ml. saturated methanolic methylamine and the solution is refluxed for 3½ hours. It is then evaporated on the steam cone and the residue triturated first with 100 ml. diethyl ether, then with 10 ml. water and recrystallized from aqueous ethanol to yield the 2-methylamino-4-phenyl-6-chloro-3,4-dihydroquinazoline hydrochloride of the formula

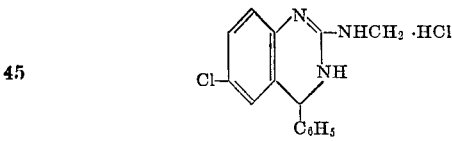

melting at 249–251° with decomposition.

The starting material is prepared as follows: To the stirred suspension of 29.0 g. 2,6-dichloro-4-phenyl-quinazoline in 800 ml. methanol, 40.0 g. sodium borohydride are added portion-wise during 40 minutes. After the foaming has subsided nearly all of the material is dissolved. The reaction mixture is filtered, the filtrate concentrated to about 500 ml. at the steam cone and the concentrate poured into 2.5 liter water. The precipitate formed is filtered off, washed with water and dissolved in about 2.5 liter diethyl ether. The solution is washed 3 times with water, dried, filtered and evaporated. The residue is recrystallized from diethyl ether and dried in vacuo to yield the 2,6-dichloro-4-phenyl-3,4-dihydro-quinazoline melting at 164–166°.

In the analogous manner the 2-isopropylamino-4-phenyl-6-chloro-3,4-dihydro-quinazoline hydrochloride is obtained.

EXAMPLE 2

4.0 g. 2,6-dichloro-4-phenyl-3,4-dihydro-quinazoline are treated with 90 ml. anhydrous dimethylamine and the resulting solution is allowed to evaporate overnight. The residue is dissolved in 25 ml. ethanol and the product precipitated with diethyl ether. It is filtered off and recrystallized from water to yield the 2-dimethylamino-4-phenyl-6-chloro-3,4-dihydroquinazoline hydrochloride of the formula

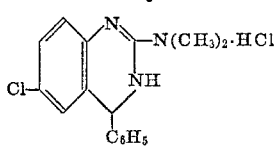

melting at 307–309° with decomposition.

1.0 g. thereof are dissolved in 100 ml. warm water and the solution made basic with sodium hydroxide. The precipitate formed is filtered off, washed with water, recrystallized from diethyl ether and dried at 65° to yield the corresponding base melting at 163–165°.

In the analogous manner the 2-N-methyl-N-ethylamino-4-phenyl-6-chloro-3,4 - dihydro-quinazoline hydrochloride is obtained.

EXAMPLE 3

4.0 g. 2,6-dichloro-4-phenyl-3,4-dihydro-quinazoline are dissolved in 35 ml. pyrrolidine and the solution allowed to stand at room temperature for 2 days. It is then evaporated on the steam cone, the residue triturated with water and recrystallized from ethanol to yield the 2-pyrrolidino-4-phenyl-6 - chloro-3,4-dihydro-quinazoline of the formula

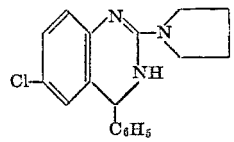

melting at 178–180°.

EXAMPLE 4

The mixture of 4.0 g. 2,6-dichloro-4-phenyl-3,4-dihydro-quinazoline and 4.0 g. 2-dimethylamino-ethylamine is heated at the steam cone for 2 hours and the excess amine evaporated. The residue is triturated with ethanol and diethyl ether and recrystallized from ethanol-diethyl ether to yield as fraction A the 2-(2-dimethylamino-ethylamino)-4-phenyl-6-chloro-3,4-dihydro-quinazoline of the formula

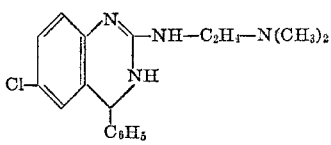

melting at 153–154° after another recrystallization from diethyl ether. The smaller fraction B represents the corresponding dihydrochloride, which melts after another recrystallization from ethanol-diethyl ether at 280–281°.

EXAMPLE 5

The mixture of 3.0 g. 2,6-dichloro-4-phenyl-3,4-dihydro-quinazoline and 25 ml. morpholine is heated at the steam cone for 2 hours. Hereupon it is evaporated, the residue triturated with water and recrystallized from ethanol to yield the 2-morpholino-4-phenyl-6-chloro-3,4-dihydro-quinazoline of the formula

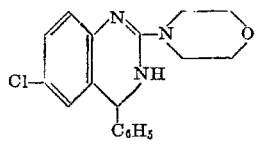

melting at 198–200°.

Replacing the morpholine by the same amount of 1-methyl-piperazine the 2-(4-methyl-piperazino)-4-phenyl-6-chloro-3,4-dihydro-quinazoline is obtained, melting at 163–164° after recrystallization from ethanol.

EXAMPLE 6

The mixture of 4.0 g. 2,6-dichloro-4-phenyl-3,4-dihydro-quinazoline and 50 ml. i-butylamine is refluxed at the steam cone for 2 hours and then evaporated. The residue is triturated with 20 ml. water, filtered off, dried and recrystallized from ethanol to yield the 2-i-butylamino-6-chloro-4-phenyl-3,4-dihydro-quinazoline of the formula

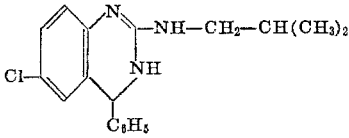

melting at 200–201°.

EXAMPLE 7

The mixture of 3.5 g. α-phenyl-(2-amino-5-chloro)-benzylamine, 3.5 g. S-methyl-isothiourea hydrochloride and 100 ml. ethanol is refluxed for 6 hours and allowed to stand overnight. It is then evaporated in vacuo, the residue taken up in 100 ml. 2 N-aqueous sodium hydroxide, and the mixture extracted with diethyl ether. The extract is dried, concentrated to about 70 ml. and allowed to stand in the cold. The precipitate formed is filtered off and recrystallized from diethyl ether to yield the 2-amino-6-chloro-4-phenyl-3,4-dihydro-quinazoline of the formula

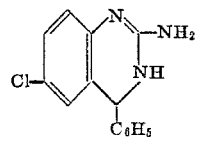

melting at 222–224°.

The starting material is prepared as follows: 25.0 g. of the oxime of 2-amino-5-chloro-benzophenone are hydrogenated in 250 ml. ethanol and 40 ml. 18% aqueous hydrochloric acid at 42°. After the theoretical hydrogen uptake, it is filtered and the filtrate evaporated. The residue is recrystallized from ethanol diethyl ether to yield the α-phenyl-(2-amino-5-chloro)-benzylamine dihydrochloride hemihydrate melting at 220–224° with decomposition. It is taken up in the minimum amount of water, the solution made basic with the ice cold aqueous sodium hydroxide, the mixture extracted with diethyl ether, the extract dried, filtered and evaporated to yield the corresponding base.

EXAMPLE 8

The mixture of 2.5 g. N-methyl-α-phenyl-(2-amino-5-chloro)-benzylamine, 2.25 g. S-methyl-isothiourea hydrochloride and 80 ml. ethanol is refluxed for 6 hours and allowed to stand overnight at room temperature. It is then evaporated, the residue taken up in 2 N-aqueous sodium hydroxide, and the mixture extracted with diethyl ether. The extract is washed with water, dried, filtered and evaporated. The residue is recrystallized several times from methanol to yield the 2-amino-3-methyl-4-phenyl-6-chloro-3,4-dihydro-quinazoline of the formula

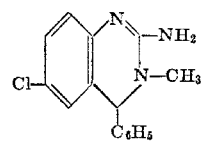

melting at 275–277.5°.

The starting material is prepared as follows: To the mixture of 2.1 g. α-phenyl-(2-amino-5-chloro)-benzyl-alcohol and 80 ml. methylene chloride, 4.5 ml. thionyl chloride are added dropwise and the whole is refluxed for ½ an hour and allowed to stand at room temperature for 2 hours. It is evaporated in vacuo, the residue taken up in methylene chloride and the solution saturated with methylamine for ½ an hour. The mixture is allowed to stand for 2 hours at room temperature, filtered and the filtrate evaporated. The residue is taken up in diethyl ether, the solution extracted with 2 N-hydrochloric acid, the aqueous layer filtered and the filtrate made basic with aqueous sodium hydroxide. It is extracted with diethyl ether, the extract washed with water, dried and evaporated to yield the N-methyl-α-phenyl-(2-amino-5-chloro)-benzylamine.

EXAMPLE 9

The mixture of 3.5 g. 2-methylamino-6-chloro-4-phenyl-3,4-dihydro-quinazoline and 45 ml. acetanhydride is heated at the steam cone for 1 hour and then evaporated. The residue is recrystallized from diethyl ether to yield the 2 - (N-acetyl-N-methylamino)-6-chloro-4-phenyl-3,4-dihydro-quinazoline of the formula

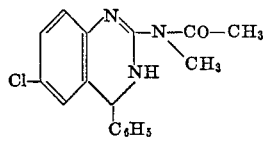

melting at 158–160°.

In case the above mixture is refluxed for 2 hours, the 2 - (N - acetyl - N - methylamino)-3-acetyl-6-chloro-4-phenyl-3,4-dihydro-quinazoline of the formula

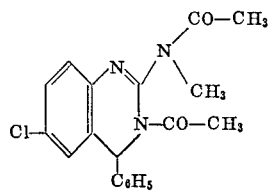

is obtained, melting after recrystallization from diethyl ether-petroleum ether at 147.5–148.5°.

EXAMPLE 10

The mixture of 1.5 g. 2 - dimethylamino - 6 - chloro-4 - phenyl - 3,4 - dihydro - quinazoline and 10 ml. methyl iodide is refluxed for 2 hours and then evaporated. The residue is triturated with ethanol, filtered off and recrystallized from ethanol to yield the 2 - trimethylammonium-6 - chloro - 4 - phenyl - 3,4 - dihydro - quinazoline iodide of the formula

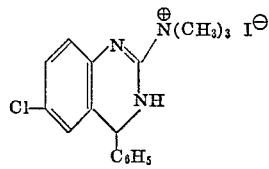

melting at 310.5–312.5°.

EXAMPLE 11

To the mixture of 3.0 g. 2 - dimethylamino - 6 - chloro-4 - phenyl - 3,4 - dihydro - quinazoline, 1.5 g. of a 56% suspension of sodium hydride in mineral oil and 250 ml. toluene, 35 ml. methyl iodide are added and the whole refluxed for 6 hours. After standing overnight a few drops of water are added, the precipitate is filtered off, washed with water and diethyl ether, dried and recrystallized from ethanol-diethyl ether to yield the 2-trimethylammonium - 3 - methyl - 6 - chloro - 4 - phenyl - 3,4-dihydro-quinazoline iodide of the formula

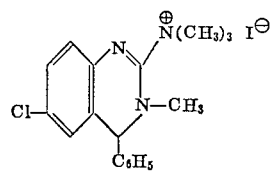

melting at 168–170°.

In the analogous manner the 2 - (N - benzyl - N,N-dilmethylammonium) - 3 - methyl - 6 - chloro - 4 - phenyl-3,4 - dihydro - quinazoline iodide is prepared, melting after recrystallization from methanol at 239–241°.

EXAMPLE 12

The mixture of 3.7 g. 2 - chloro - 4 - phenyl - 3,4 - dihydro - quinazoline and 80 ml. dimethylamine is allowed to stand overnight at room temperature and is then slowly evaporated. The residue is recrystallized from ethanol-diethyl ether to yield the 2 - dimethylamino - 4 - phenyl-3,4 - dihydro - quinazoline hydrochloride of the formula

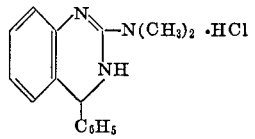

melting at 246–249°.

The starting material is prepared as follows: To the stirred suspension of 7.5 g. 2 - chloro - 4 - phenyl - quinazoline in 250 ml. methanol, 18.0 g. sodium borohydride are added portionwise and the reaction mixture boiled at the steam cone for 25 minutes. Hereupon it is concentrated to about 180 ml., cooled and 300 ml. water are added. The mixture is extracted with diethyl ether, the extract washed with water, dried, filtered and concentrated to a small volume. The precipitate formed is filtered off and recrystallized from diethyl ether to yield the 2 - chloro - 4 - phenyl - 3,4 - dihydro - quinazoline melting at 169–171°.

EXAMPLE 13

To the stirred mixture of 1.1 g. N - methyl - α - phenyl-(2 - amino - 5 - chloro) - benzylamine, and 100 ml. toluene, the solution of 1.1 g. cyanogen amide in 50 ml. toluene is added dropwise and the mixture refluxed for 3 hours. It is evaporated in vacuo, the residue treated with 2 N-aqueous sodium hydroxide and the mixture extracted with diethyl ether. The extract is dried, filtered, evaporated and the residue heated to about 100°. It is then recrystallized several times from methanol to yield the 2 - amino - 3 - methyl - 4 - phenyl - 6 - chloro - 3,4-dihydro-quinazoline melting at 275–277°; it is identical with that obtained according to Example 8.

EXAMPLE 14

The mixture of 4.0 g. 2,6 - dichloro - 4 - phenyl - 3,4-dihydro-quinazoline and 25 ml. N - (2 - hydroxyethyl)-N-methylamine is heated at the steam cone for 3 hours and then evaporated in vacuo. The residue is triturated with water, filtered off and recrystallized from ethanol to yield the 2 - (N - 2 - hydroxyethyl - N - methylamino)-6 - chloro - 4 - phenyl - 3,4-dihydro - quinazoline of the formula

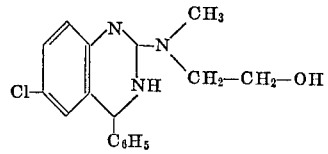

melting at 184–186°.

EXAMPLE 15

The mixture of 3.5 g. 2,6-dichloro-4-phenyl-3,4-dihydro-quinazoline, 20 ml. 95% anhydrous hydrazine and 50 ml. methanol is heated at the steam cone for 2 hours. It is diluted with methanol to 250 ml., heated for another 2 hours and concentrated to 50 ml. Thereupon 200 ml. water are added, the precipitate formed, filtered off and recrystallized from ethanol to yield the 2-hydrazino-6-chloro-4-phenyl-3,4-dihydro-quinazoline of the formula

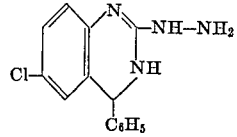

melting at 250–252°.

EXAMPLE 16

In the manner described in the previous examples, the following compounds of Formula II are prepared from equivalent amounts of the corresponding starting materials: $R_7$=phenyl

| $R_5+R_6$ | Salt | M.P., degrees | Recryst. from |
|---|---|---|---|
| N+N(CH$_3$)$_2$ | | 201–203 | etOH |
| H+C$_2$H$_5$ | HCl | 212–214 | etOH—et$_2$O |
| H+CH$_2$—CH$_2$—OH | HCl | 204–206 | meOH—et$_2$O |
| CH$_3$+n-C$_3$H$_7$ | | 130–131 | et$_2$O |
| CH$_3$+CH$_2$—CH=CH$_2$ | | 124–125 | et$_2$O |
| CH$_3$+CH$_2$—C$_6$H$_5$ | | 117–118 | et$_2$O-pet. eth. |
| H+△ | | 181–183 | etOH—H$_2$O |
| H+CH$_2$—⟨N=⟩ | | 158–160 | meOH—et$_2$O |
| N+(CH$_2$)$_3$—N⟨⟩N—CH$_3$ | | 192–193 | etOH |
| 1,5-pentylene | | 216–217 | etOH |
| 1,6-hexylene | | 122–123 | et$_2$O |

EXAMPLE 17

Preparation of 1000 tablets each containing 50 mg. of the active ingredient:

Formula: G.
- 2-dimethylamino-6-chloro-4-phenyl-3,4-dihydro-quinazoline hydrochloride ____ 50.0
- Colloidal silica ____ 2.5
- Corn starch ____ 7.5
- Magnesium stearate ____ 1.0
- Lactose ____ 89.0
- Ethanol (anhydrous), q.s.
- Purified water, q.s.

Procedure: The lactose and the drug substance are passed through a comminuting machine using a screen with 1.2 mm. openings. The stearate, starch and silica, previously mixed with a small portion of the lactose, are added to the sieved powders, which are mixed at low speed for 30 minutes. They are then granulated with ethanol-water (1:1) until suitable granules are formed. The granulate is passed through a comminuting machine (knives forward) using a screen with 4.0 mm. openings. The granulate is dried at 49° to a moisture content below 2%, again passed through a comminuting machine (knives forward) using a screen with 1.4 mm. openings and compressed into 150 mg. tablets using standard concave punches with 7.1 mm. diameter.

In the analogous manner tablets are prepared, each containing 50 mg. of the 2-cyclopropylamino- or 2-piperidino-6-chloro-4-phenyl-3,4-dihydro-quinazoline.

EXAMPLE 18

Preparation of 10,000 tablets each containing 50 mg. of the active ingredient:

Formula: G.
- 2-N,N-dimethylhydrazino-6-chloro-4-phenyl-3,4-dihydro-quinazoline ____ 500.0
- Lactose ____ 1706.0
- Corn starch ____ 90.0
- Polyethylene glycol 6,000 ____ 90.0
- Talcum powder ____ 90.0
- Magnesium stearate ____ 24.0
- Purified water, q.s.

Procedure: All of the powders are passed through a screen with an opening of 0.6 mm. Then the drug substance, lactose, talcum, magnesium stearate and half of the starch are mixed in a suitable mixer. The other half of the starch is suspended in 50 ml. water and the suspension added to the boiling solution of the polyethylene glycol in 50 ml. water. The paste formed is added to the powders which are granulated, if necessary, with an additional amount of water. The granulate is dried overnight at 35°, broken on a screen with 1.2 mm. openings and compressed into tablets using concave punches with 7.1 mm. diameter, uppers bisected.

EXAMPLE 19

The mixture of 4.0 g. 2,6-dichloro-4-phenyl-3,4-dihydro-quinazoline and 30 ml. pyridyl - 2 - methylamine is heated on the steam cone for 30 minutes and is evaporated in vacuo. The residue is taken up in water, the mixture extracted with diethyl ether, the extract washed with water, dried, filtered and concentrated to about 150 ml. The precipitate formed in the cold is filtered off and recrystallized from methanol-diethyl ether, to yield the 2-(2-pyridyl)-methylamino - 4 - phenyl - 6 - chloro-3,4-dihydro-quinazoline of the formula

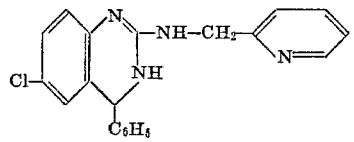

melting at 159–160°.

EXAMPLE 20

The mixture of 1.0 g. 2,6-dichloro - 4 - (4-fluorophenyl) - 3,4 - dihydro-quinazoline and 20 ml. dimethylamine is allowed to stand for 3 days at room temperature and is then evaporated. The residue is taken up in 25 ml. hot ethanol and the solution added to 80 ml. diethyl ether. The precipitate formed is filtered off, washed with diethyl ether and recrystallized from ethanol-diethyl ether to yield the 2-dimethylamino - 4 - (4 - fluoro-phenyl)-6 - chloro - 3,4 - dihydro-quinazoline hydrochloride of the formula

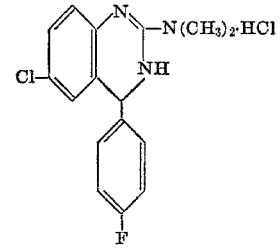

melting at 280–281°.

0.5 g. thereof are dissolved in 40 ml. hot water, the cooled solution made basic with aqueous sodium hydroxide and the precipitate formed filtered off. It is recrystallized from diethyl ether to yield the corresponding free base melting at 181–182°.

The starting material is prepared as follows: The mixture of 19.8 g. 2-amino-5-chloro-4′-fluoro-benzophenone and 10 g. urea is slowly heated to about 200° for 12 hours, during which time the original melt solidifies. It is cooled, ground, triturated with methanol and filtered. The residue is recrystallized from ethanol-methanol to yield the 6-chloro - 4 - (4 - fluoro-phenyl)-1,2-dihydro-2-quinazoline melting at 335–336°.

The mixture of 14.5 g. thereof and 230 ml. phosphorus oxychloride is refluxed for 3½ hours and evaporated in vacuo. The residue is taken up in 7% aqueous potassium carbonate, the mixture extracted with diethyl ether, the extract washed with water, dried, filtered and evaporated. The residue is recrystallized from diethyl ether to yield the 2,6-dichloro - 4 - (4 - fluoro-phenyl)-quinazoline melting at 182–183°.

To the suspension of 9 g. thereof in 300 ml. methanol, 24 g. sodium borohydride are added portionwise during 10 minutes. The mixture is heated on the steam cone for about ½ hour, cooled and poured into cold water while stirring. The precipitate formed is filtered off, washed with water and dissolved in 700 ml. diethyl ether. The solution is dried, filtered, concentrated to 100 ml. and cooled. The precipitate formed is filtered off and recrystallized from diethyl ether, to yield the 2,6-dichloro-4-(4-fluoro-phenyl) - 3,4 - dihydro-quinazoline melting at 175–177°.

EXAMPLE 21

To the solution of 3.0 g. N-methyl-α-phenyl-(2-amino-5-chloro)-benzylamine in 120 ml. toluene, 1.5 g. cyanogen bromide are added while stirring and the mixture allowed to stand at room temperature for 1 hour, during which time the N-methyl-α-phenyl(2 - amino - 5 - chloro)-benzyl-cyanamide hydrobromide precipitates. The suspension is then heated to reflux while stirring and refluxed for 10 minutes. It is cooled, the supernatant solution decanted off, the residue washed with diethyl ether and recrystallized from methanol to yield the 2 - amino-3-methyl - 4 - phenyl - 6 - chloro-3,4-dihydro-quinazoline hydrobromide melting at 268–269°; the corresponding base is identical with the product obtained according to Example 8.

EXAMPLE 22

Preparation of 10,000 tablets each containing 100.0 mg. of the active ingredient:

Formula:                                                      G.
2-dimethylamino - 4 - (4-fluoro-phenyl)-6-chloro - 3,4 - dihydro-quinazoline hydrochloride _____ 1,000.00
Lactose _____ 2,535.00
Corn starch _____ 125.00
Polyethylene glycol 6,000 _____ 150.00
Talcum powder _____ 150.00
Magnesium stearate _____ 40.00
Purified water, q.s.

Procedure: All the powders are passed through a screen with openings of 0.6 mm. Then the drug substance, lactose, talcum, magnesium stearate and half of the starch are mixed in a suitable mixer. The other half of the starch is suspended in 65 ml. water and the suspension added to the boiling solution of the polyethylene glycol in 260 ml. water. The paste formed is added to the powders which are granulated, if necessary, with an additional amount of water. The granulate is dried overnight at 35°, broken on a screen with 1.2 mm. openings and compressed into tablets using concave punches with 10.3 mm. diameter, uppers bisected.

EXAMPLE 23

According to the method described in the previous examples, the following compounds are prepared:

2-dimethylamino-4-(3-chloro-phenyl)-7-ethyl-3,4-dihydro-quinazoline,
2-(2-hydroxyethylamino)-4-(4-methyl-phenyl)-5-methoxy-3,4-dihydro-quinazoline,
2-cyclopentylamino-3-ethyl-4-(4-trifluoromethyl-phenyl)-7-chloro-3,4-dihydro-quinazoline,
2-[4-(2-hydroxy-ethyl)-piperazino]-4-(4-isopropoxy-phenyl)-3,4-dihydro-quinazoline,
2-di-n-pentylamino-3,8-dimethyl-4(2-methoxy-phenyl)-3,4-dihydro-quinazoline,
2-N′,N′-dimethylhydrazino-4-(4-fluoro-phenyl)-3,4-dihydro-quinazoline,
2-(2-thiamorpholino-ethylamino)-4-(4-n-butyl-phenyl)-3,4-dihydro-quinazoline,
2-cyclopentylmethylamino-4-(3-nitro-phenyl)-6-ethylmercapto-3,4-dihydro-quinazoline,
2-(2-ethoxy-ethylamino)-3-benzyl-4-(4-pyridyl)-3,4-dihydro-quinazoline,
2-dibenzylamino-4-(3-thienyl)-3,4-dihydro-quinazoline,
2-(3-pyrrolidino-propylamino)-4-(3-trifluoromethyl-phenyl)3,4-dihydro-quinazoline,
2-(4-phenyl-piperazino)-3-allyl-4-(4-bromo-phenyl)-3,4-dihydro-quinazoline,
2-phenylamino-4-phenyl-3,4-dihydro-quinazoline or
2-(4-methoxy-benzylamino)-4-(3-methyl-4-pyridyl)-3,4-dihydro-quinazoline, or their acid addition salts.

EXAMPLE 24

The mixture of 5 g. 2,6-dichloro-4-(4-fluorophenyl)-3,4-dihydroquinazoline and 9.5 g. bis-(2-hydroxyethyl)-amine is heated at the steam cone for 2 hours while stirring, whereby a homogeneous solution is formed. After standing at room temperature for 2 days 60 ml. water are added, the precipitate formed filtered off, washed with water until the washings are neutral, dried and recrystallized several times from ethanol-diethyl ether, to yield the 2-bis-(2-hydroxyethyl) - amino - 4 - (4 - fluorophenyl) 6-chloro-3,4-dihydroquinazoline ethanolate of the formula

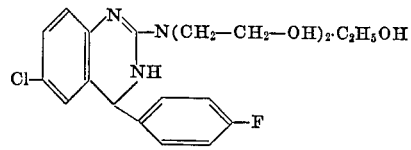

melting at 99–101° with decomposition.

I claim:

1. A member selected from the group consisting of the 2-amino-4-aryl-3,4-dihydroquinazoline having the formula

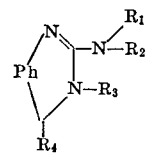

in which Ph is 1,2-phenylene, lower alkyl)-1,2-phenylene, (halogeno)-1,2-phenylene or (trifluoromethyl)-1,2-phenylene, $R_1$ is hydrogen, amino, di-lower alkylamino, lower alkyl, lower alkenyl, lower cycloalkyl, hydroxy-lower alkyl, di-lower alkylamino-lower alkyl, N-lower alkyl-piperazino-lower alkyl, phenyl-lower alkyl or pyridyl-lower alkyl, or $R_1$ and $R_2$, when taken together, represent lower alkylene, 3-oxa-1,5-pentylene or 3-lower alkyl-3-aza-1,5-pentylene, each of $R_2$ and $R_3$ are hydrogen or lower alkyl and $R_4$ is phenyl, (lower alkyl)-phenyl, (halogeno)-phenyl or (trifluoromethyl)-phenyl, in all of which radicals the term "lower" defines such with up to 4 carbon atoms, lower alkanoyl, derivatives or therapeutically acceptable acid addition salts thereof.

2. A compound as claimed in claim 1 and having the formula

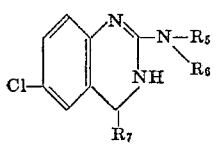

in which $R_5$ is hydrogen, methyl or ethyl and $R_6$ is hydrogen, amino, dimethylamino, methyl, ethyl, n-propyl, i-butyl, allyl, cyclopropyl, 2-hydroxyethyl, 2-dimethylamino-ethyl, 3-(4-methylpiperazino)-propyl, benzyl or 2-pyridylmethyl or $R_5$ and $R_6$ together are 1,4-butylene, 1,5-pentylene, 1,6-hexylene, 3-methyl-3-aza-1,4-pentylene or 3-oxa-1,5-pentylene and $R_7$ is phenyl or therapeutically acceptable acid addition salts thereof.

3. A compound as claimed in claim 1 and having the formula

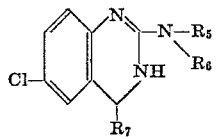

in which each of $R_5$ and $R_6$ is methyl, ethyl or 2-hydroxyethyl and $R_7$ is phenyl, fluorophenyl or chlorophenyl, or therapeutically acceptable acid addition salts thereof.

4. A compound as claimed in claim 2 and being a member selected from the group consisting of the 2-dimethylamino-4-phenyl-6-chloro-3,4-dihydro-quinazoline or a therapeutically acceptable acid addition salt thereof.

5. A compound as claimed in claim 3 and being a member selected from the group consisting of the 2-dimethylamino-4-(4-fluoro-phenyl)-6-chloro - 3,4 - dihydroquinazoline or a therapeutically acceptable acid addition salt thereof.

6. A compound as claimed in claim 3 and being a member selected from the group consisting of the 2-bis-(2-hydroxyethyl) - amino - 4 - (4 - fluoro - phenyl) - 6-chloro-3,4-dihydro-quinazoline or a therapeutically acceptable acid addition salt thereof.

References Cited
UNITED STATES PATENTS 3,305,553  2/1967  Hoefle _____ 260—28.4

ALEX MAZEL, Primary Examiner

R. J. GALLAGHER, Assistant Examiner

U.S. Cl. X.R.

260—243 B, 247.1, 247.2 R, 247.2 A, 247.5 B, 256.4 Q, 551 Q, 552 R, 553 A, 564 A, 530.5 P; 424—200, 232, 246, 248, 251

PO-1050
(5/69)

UNITED STATES PATENT OFFICE
CERTIFICATE OF CORRECTION

Patent No. 3,646,028    Dated February 29, 1972

Inventor(s) Gordon Northrup Walker

It is certified that error appears in the above-identified patent and that said Letters Patent are hereby corrected as shown below:

Column 1, line 5, delete "CIBA Corporation, Summit, N.J." and substitute --- CIBA-GEIGY Corporation, Ardsley, N. Y. ---

Signed and sealed this 30th day of April 1974.

(SEAL)
Attest:

EDWARD M. FLETCHER, JR.
Attesting Officer

C. MARSHALL DANN
Commissioner of Patents